(12) United States Patent
Mukai

(10) Patent No.: US 8,733,411 B2
(45) Date of Patent: May 27, 2014

(54) PNEUMATIC TIRE WITH TREAD HAVING V-SHAPED GROOVES

(75) Inventor: Tomoyuki Mukai, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1058 days.

(21) Appl. No.: 12/652,098

(22) Filed: Jan. 5, 2010

(65) Prior Publication Data

US 2010/0252159 A1 Oct. 7, 2010

(30) Foreign Application Priority Data

Apr. 6, 2009 (JP) .................................. 2009-092279

(51) Int. Cl.
    *B60C 11/03* (2006.01)
    *B60C 11/12* (2006.01)
    *B60C 11/13* (2006.01)

(52) U.S. Cl.
    USPC ............ 152/209.21; 152/209.22; 152/209.28; 152/DIG. 3

(58) Field of Classification Search
    USPC ............. 152/209.21, 209.22, 209.28, DIG. 3; D12/537, 551–556
    See application file for complete search history.

(56) References Cited

U.S. PATENT DOCUMENTS

| | | | | |
|---|---|---|---|---|
| D316,842 S | * | 5/1991 | Graas | D12/551 |
| 5,105,864 A | * | 4/1992 | Watanabe et al. | 152/209.18 |
| 5,158,626 A | * | 10/1992 | Himuro | 152/209.28 |
| 5,924,464 A | * | 7/1999 | White | 152/209.21 |
| 6,109,317 A | * | 8/2000 | Iwamura et al. | 152/209.28 |
| 6,691,753 B2 | * | 2/2004 | Hanebuth et al. | 152/209.28 |
| 6,923,232 B1 | * | 8/2005 | Welbes et al. | 152/209.22 |

FOREIGN PATENT DOCUMENTS

| | | | | |
|---|---|---|---|---|
| CN | 200960835 Y | * | 10/2007 | |
| DE | 9417687 U1 | * | 8/1995 | |
| EP | 788898 A1 | * | 8/1997 | |
| JP | 60-169305 A | * | 9/1985 | |
| JP | 05-169918 A | * | 7/1993 | |
| JP | 2000-247110 A | * | 9/2000 | |
| JP | 2004-224249 A | * | 8/2004 | |
| JP | 06-286424 A | * | 10/2004 | |

OTHER PUBLICATIONS

Machine translation for Japan 2004-224249 (no date).*
Machine translation for Europe 788,898 (no date).*
Machine translation for Japan 06-286424 (no date).*
Machine translation for German 9417687 (no date).*
Derwent abstract for China 200960835 (no date).*
Machine translation for Japan 2000-247110 (no date).*
Machine translation for Japan 05-169918 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire has a unidirectional tread pattern comprising right-hand and left-hand crown circumferential grooves and a crown rib formed therebetween. The crown rib is provided with first and second V-shaped grooves arranged alternately in the tire circumferential direction. The first V-shaped grooves extend from the left-hand crown circumferential groove. The second V-shaped grooves extend from the right-hand crown circumferential groove. The first and second V-shaped grooves are terminated within the rib, and their V-shape configurations have bending points substantially positioned at the tire equator.

6 Claims, 9 Drawing Sheets

PNEUMATIC TIRE WITH TREAD HAVING V-SHAPED GROOVES

BACKGROUND OF THE INVENTION

The present invention relates to a pneumatic tire, more particularly to a unidirectional tread pattern suitable for running on dry pavements as well as snowy/icy pavements.

Heretofore, in order to improve steering stability on dry pavements, a widely employed technique is to increase the land ratio of the tread pattern as far as possible, in other words, to increase the tread pattern rigidity, namely, overall rigidity of tread elements such as block, rib and the like. However, if the land ratio becomes increased, since the volume of tread grooves is decreased, a shearing force of snow trodden and packed in the tread grooves decreases, and on-the-snow performance tends to deteriorate.

When the shearing force of the packed snow is large, it can produce a large traction force or braking force, therefore, good snow grip performance can be obtained.

On the other hand, in order improve steering stability on snowy/icy pavements, a widely employed technique is to increase the total length of the edges of the tread elements in the tread portion for example by forming sipes or cuts. This technique is commonly employed in winter tires so called studless tires.

If a large number of sipes is however, provided in the tread portion, the rigidity of the tread elements such as blocks is decreased, therefore, it is inevitable that the steering stability on dry pavements is deteriorated, and the tread portion suffers from uneven wear.

SUMMARY OF THE INVENTION

It is therefore, an object of the present invention to provide a pneumatic tire having a unidirectional tread pattern which can improve the steering stability on dry pavements as well as snowy/icy pavements, and also which can improve the uneven wear resistance during running on dry pavements.

According to the present invention, a pneumatic tire comprises:

a tread portion provided with a unidirectional tread pattern including a pair of right-hand and left-hand crown circumferential grooves which are disposed one on each side of the tire equator and extend continuously in the tire circumferential direction so as to form a circumferentially continuously extending crown rib therebetween, the crown rib provided with first V-shaped grooves and second V-shaped grooves arranged alternately in the tire circumferential direction, each of the first V-shaped grooves extending from its open end at the left-hand crown circumferential groove to its closed end positioned between the right-hand crown circumferential groove and the tire equator, each of the second V-shaped grooves extending from its open end at the right-hand crown circumferential groove to its closed end positioned between the left-hand crown circumferential groove and the tire equator, each of the first and second V-shaped grooves made up of a primary part extending from the open end thereof towards the tire equator while inclining to one circumferential direction corresponding to an intended rotational direction of the unidirectional tread pattern, and a secondary part extending from the primary part to the closed end while inclining to the other circumferential direction opposite to the rotational direction, wherein a bending point between the primary part and secondary part is substantially positioned at the tire equator.

Preferably, the inclination angle of the primary part is in a range of from 20 to 40 degrees with respect to the circumferential direction, and the angle between the primary part and the secondary part is in a range of from 40 to 80 degrees. At least one of the axial edges of the crown rib is made up of straight segments defined between the circumferentially adjacent open ends of the V-shaped grooves, and the straight segments are inclined to the tire equator toward the rotational direction so that one circumferential end of each of the straight segments is axially shifted from the circumferentially adjacent other circumferential end of one of the circumferentially adjacent straight segments.

DESCRIPTION OF THE PREFERRED EMBODIMENTS

Figure 1:
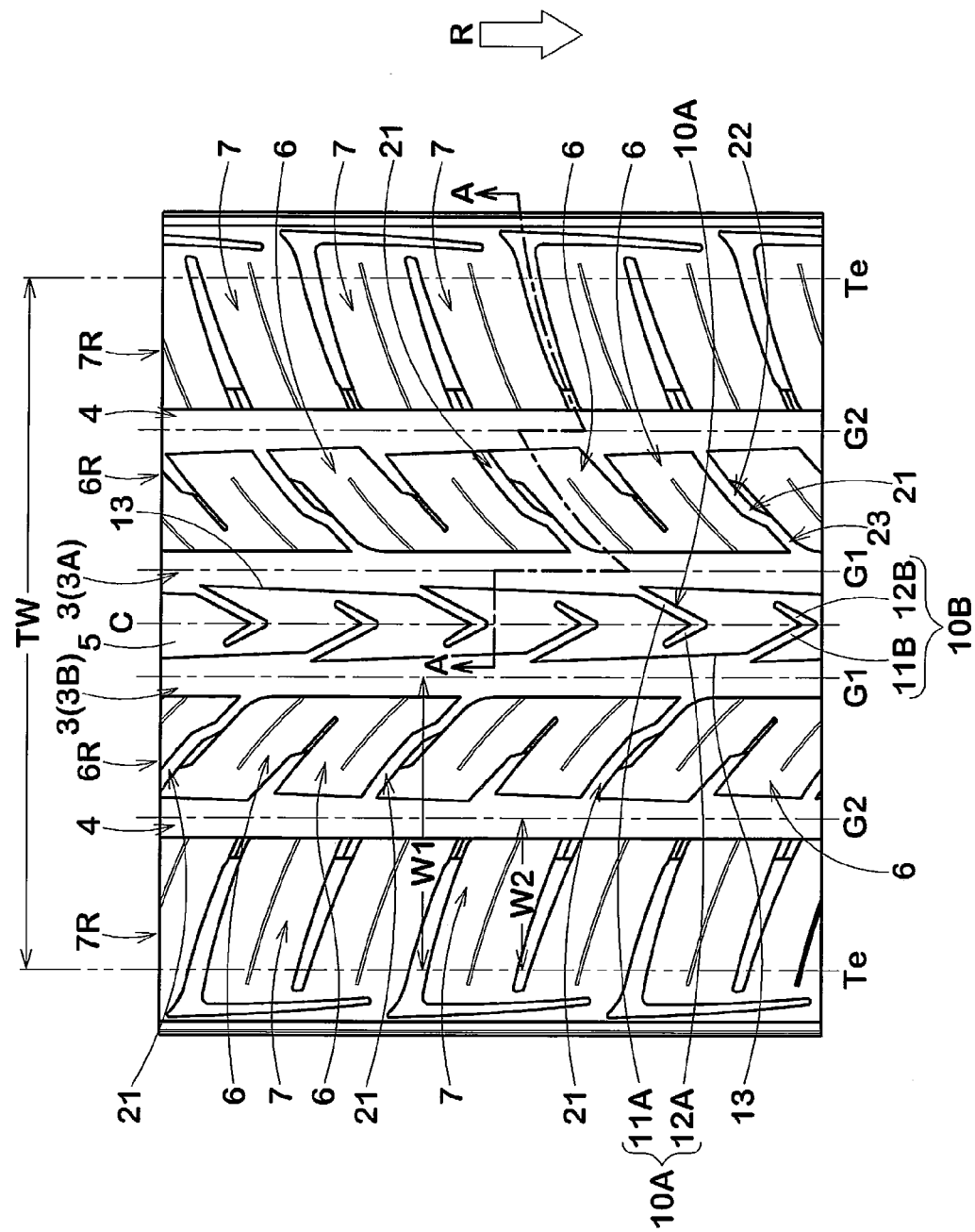
FIG. 1 is a developed partial plan view of a pneumatic tire according to the present invention showing a unidirectional tread pattern.

The present invention can be suitably applied to passenger radial tires, therefore, taking a passenger radial tire as an example, embodiments of the present invention will now be described in detail in conjunction with the accompanying drawings.

The radial tire namely pneumatic tire comprises, as well known in the art, a tread portion 2 having tread edges Te, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion.

The tread portion 2 is provided with tread grooves defining a tread pattern. The tread pattern is a unidirectional tread patter, and the designed or intended rotational direction R of the tire is inscribed in the sidewall portions by letters and an arrow.

The tread grooves include: a pair of circumferentially continuously extending crown circumferential grooves 3 disposed one on each side of the tire equator C; and a pair of circumferentially continuously extending shoulder circumferential grooves 4 each disposed axially outside of one of the crown circumferential grooves 3.

Hereinafter, if needed, based on the intended tire rotational direction, one of the crown circumferential grooves 3 shown in FIG. 1 on the right-hand side, namely, on the observers' right is called "left-hand crown circumferential groove 3A", and accordingly, the other is called "right-hand crown circumferential groove 3B".

In this embodiment, the crown and shoulder circumferential grooves 3 and 4 are straight grooves essentially having a superior drainage performance and a superior snow self-ejecting performance.

The annular portion between the two crown circumferential grooves 3 forms a single crown rib 5 which extends continuously in the tire circumferential direction. More specifically, in this annular portion, there is no groove extending across the entire width of the annular portion.

The annular portions between the crown circumferential grooves 3 and shoulder circumferential grooves 4 are each formed as middle blocks 6 arranged in one circumferential row 6R.

The annular portions between the shoulder circumferential grooves 4 and the tread edges Te are each formed as shoulder blocks arranged in one circumferential row 7R.

In order to provide a necessary tread rigidity without sacrificing the drainage performance and snow self-ejecting performance, the axial width Tg1 of the crown circumferential grooves 3 is set in the range of from 4.0 to 6.0% of the tread width TW, and
the axial width Tg2 of the shoulder circumferential grooves 4 is set in the range of from 3.0 to 5.0% of the tread width TW.

In order to promote drainage in the vicinity of the tire equator where the ground pressure becomes highest and further improve the aquaplaning performance, the axial width Tg1 is preferably more than the axial width Tg2.

Here, the tread width TW is the axial distance between the tread edges Te measured in a normally inflated unloaded condition of the tire.

The tread edges Te are the axial outermost edges of the ground contacting region in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

In this application, various dimensions, positions and the like refer to those under the normally inflated unloaded condition of the tire unless otherwise noted.

In order to secure a sufficient groove volume and improve the snow self-ejecting performance, the groove depth Ug1 of the crown circumferential grooves 3 and the groove depth Ug2 of the shoulder circumferential grooves 4 are preferably set in a range of not less than 6 mm, more preferably not less than 7 mm, but not more than 10 mm, more preferably not more than 9 mm.

The axial distance W1 of the widthwise center line G1 of the crown circumferential groove 3 from the adjacent tread edge Te is preferably set in a range of not less than 39%, but not more than 47%, more preferably not more than 43% of the tread width TW.

The axial distance W2 of the widthwise center line G2 of the shoulder circumferential groove 4 from the adjacent tread edge Te is preferably set in a range of not less than 19%, but not more than 27% of the tread width TW.

By setting the axial distances W1 and W2 within the above-mentioned ranges, the rigidity balance between the crown rib 5 and the middle block rows 6R can be optimized to improve steering stability.

Figure 3:
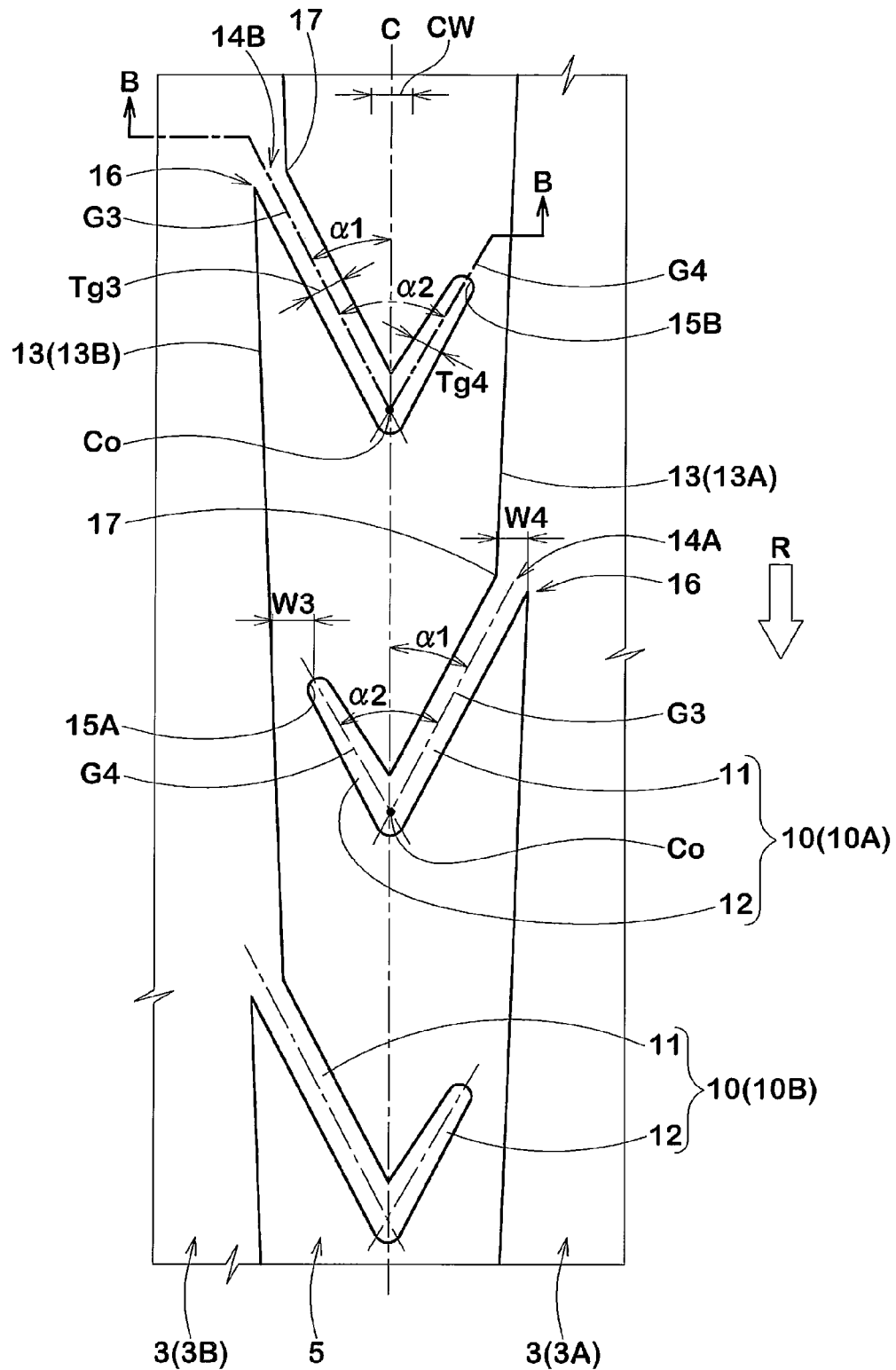
FIG. 3 is an enlarged plan view of the crown rib.

As shown in FIG. 3, the crown rib 5 is provided with first V-shaped grooves 10A and second V-shaped grooves 10B which are arranged alternately in the tire circumferential direction.

The first V-shaped groove 10A extends from the left-hand crown circumferential groove 3A towards the right-hand crown circumferential groove 3B and terminates with in the crown rib 5 so as to have an open end 14A open to the left-hand crown circumferential groove 3A, and a closed end 15A positioned between the right-hand crown circumferential groove 3B and the tire equator C.

The second V-shaped groove 10B extends from the right-hand crown circumferential groove 3B towards the left-hand crown circumferential groove 3A and terminates with in the crown rib 5 so as to have an open end 14B open to the right-hand crown circumferential groove 3B, and a closed end 15B positioned between the left-hand crown circumferential groove 3A and the tire equator C.

Each of the V-shaped grooves 10 (10A, 10B) is made up of a primary part 11 extending from the open end 14 (14A, 14B) to the tire equator C while inclining toward the intended tire rotational direction R, and
a secondary part 12 extending from the tire equator C to the closed end 15 (15A, 15B) while inclining towards the opposite direction to the intended tire rotational direction R.

The bent point Co of the V shape is substantially positioned on the tire equator. In this embodiment, all of the bent points Co are exactly positioned on the tire equator. However, the bent points Co may be positioned within a zone centered on the tire equator C and having an axial width of 2.0%, preferably 1.5%, more preferably 1.0% of the tread width TW in view of uniformity.

Therefore, in the crown rib 5 where the ground pressure becomes highest, the edge component effectual for producing traction is increased, and the shearing force of snow packed in the grooves can be increased and grip on icy roads can be increased and steering stability on snowy/icy roads is improved. Further, the bent points Co of V-shape of the first V-shaped grooves 10A and second V-shaped grooves 10B, are substantially disposed on the tire equator C, and the first V-shaped grooves 10A and second V-shaped grooves 10B are disposed alternately in the circumferential direction. Therefore, the rigidity of the crown rib 5 is evened and uneven wear is prevented.

Furthermore, in the intended tire rotational direction R, the bent point Co first contacts with the ground than other part, therefore, water is drained from the bent point Co to the crown circumferential groove 3 through the primary part 11 and the drainage performance can be improved.

The axial distance W3 of the closed end 15 (15A, 15B) from the adjacent circumferential groove 3 is preferably set in a range of not less than 1.0%, more preferably not less than 2.0%, but not more than 5.0%, more preferably not more than 4.0% of the tread width TW.

If the axial distance W3 is too large, the snow shearing force can not be obtained and on-the-snow performance is deteriorated. If too small, the rigidity of the crown rib 5 decreases and the steering stability tends to become worse.

The angle $\alpha 1$ of the primary part 11 is preferably 20 to 40 degrees with respect to the circumferential direction.

The angle $\alpha 2$ between the primary part 11 and the secondary part 12 is preferably 40 to 80 degrees.

If the angle $\alpha 1$ and angle $\alpha 2$ are too large, so called pattern noise is liable to increase. Further, the resistance of water flow into the crown circumferential groove 3 becomes increased, and drainage performance has a tendency to deteriorate.

If the angle $\alpha 1$ and angle $\alpha 2$ are too small, the corner between the primary part 11 and crown circumferential groove 3 is decreased in the rigidity, and uneven wear is liable to occur therefrom.

The axial width Tg3 of the primary part 11 is preferably set in a range of not less than 0.5%, more preferably not less than 1.0%, but not more than 2.5%, more preferably not more than 2.0% of the tread width TW.

The axial width Tg4 of the secondary part 12 is preferably set in a range of not less than 0.5%, more preferably not less than 1.0%, but not more than 2.5%, more preferably not more than 2.0% of the tread width TW.

If the axial widths Tg3 and Tg4 of the primary part 11 and secondary part 12 are too large, it becomes difficult to secure the rigidity of the crown rib 5. If the axial widths Tg3 and Tg4 are too small, the snow shearing force becomes decreased, and further the drainage has a tendency to decrease.

In order to improve drainage towards the crown circumferential groove 3, it is desirable that the axial width Tg4 of the secondary part 12 is gradually increased toward the tire equator C from the closed end 15, and the axial width Tg3 of the primary part 11 is gradually increased toward towards the open end 14 from the tire equator C.

Further, it is preferable that the closed end 15 is rounded so as to swell towards the adjacent crown circumferential groove 3 for example by a semicircle as shown in FIG. 3. Thereby, the occurrence of cracks at the closed ends 15 can be prevented.

Figure 4:
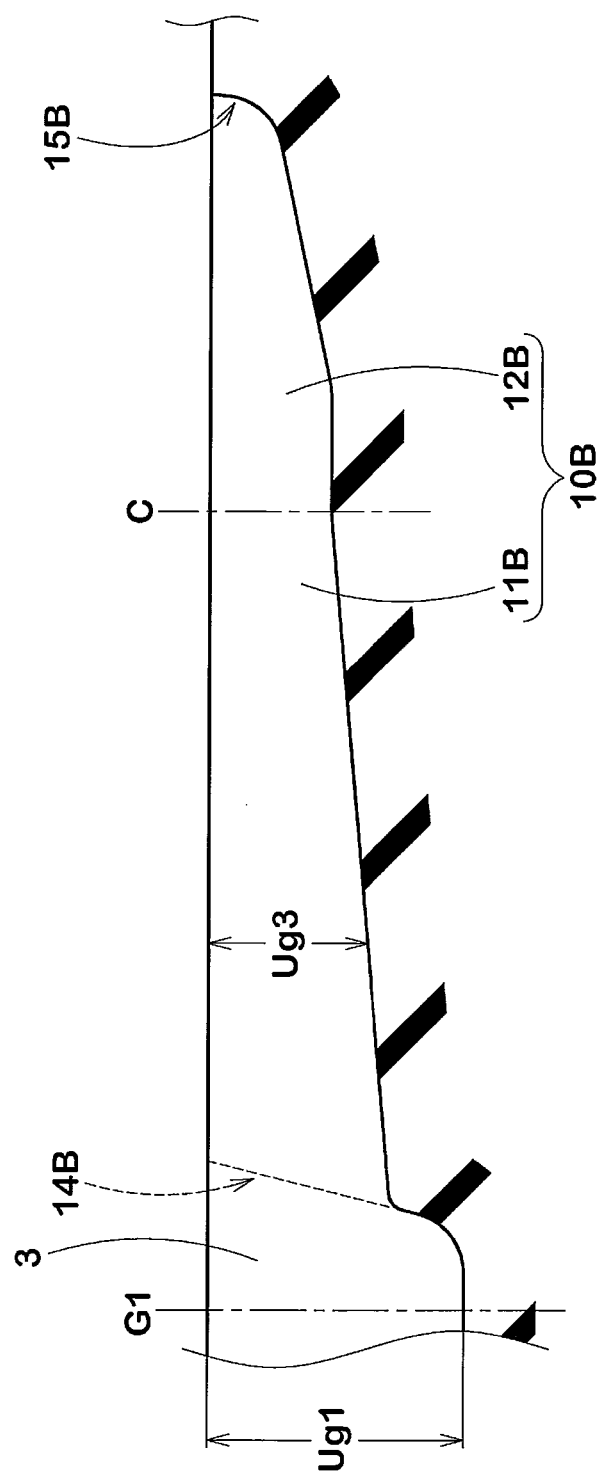
FIG. 4 is a cross sectional view of a V-shaped groove taken along the groove center line.

FIG. 4 shows the depth Ug3 of the V-shaped groove 10 along the widthwise center thereof. As shown in this figure, the depth Ug3 is gradually decreased from the open end 14 towards the closed end 15, and it is desirable that in a range from the open end 14 to the tire equator C, the depth Ug3 is between 60% and 80% of the depth Ug1.

Thereby, the tread rubber portion between the closed end 15 and the crown circumferential groove 3 can be increased in the rigidity and the uneven wear of this portion can be effectively controlled.

In the case of the passenger car tire sizes, the depth Ug3 is preferably set in a range of 1.5 to 6.0 mm.

With respect to each of the side edges 13 of the crown rib 5, each segment 13A, 13B of the side edge 13 between the circumferentially adjacent V-shaped grooves 10 is straight and slightly inclined to the tire equator C toward the intended tire rotational direction R.

Therefore, as shown in FIG. 3, at each of the open ends 14, a heel-side end 16 and a toe-side end 17 of the segments are spaced from each other by an axial distance W4.

In other words, the width of the crown rib 5 and the width of the crown circumferential groove 3 are each provided with a stepped variation along the tire circumferential direction. As a result, on the snowy roads, the sharing force of packed snow becomes available, and on-the-snow performance, especially breaking performance can be further improved.

If the distance W4 is small, it is difficult to increase the snow shearing force. If the distance W4 becomes large, the rigidity of the crown rib 5 has a tendency to decrease.

From this standpoint, the distance W4 is preferably set in a range of not less than 1.0 mm, more preferably not less than 2.0 mm, but not more than 4.0 mm, more preferably not more than 3.0 mm.

The total number P of the V-shaped grooves 10 around the tire is preferably set in a range of from 29 to 37.

If the total number P is too small, the snow shearing force is decreased, and on-the-snow performance tends to deteriorate. If the total number P is too large, the land ratio of the tread portion decreases, and the steering stability during running on dry pavements tends to deteriorate.

Figure 2:
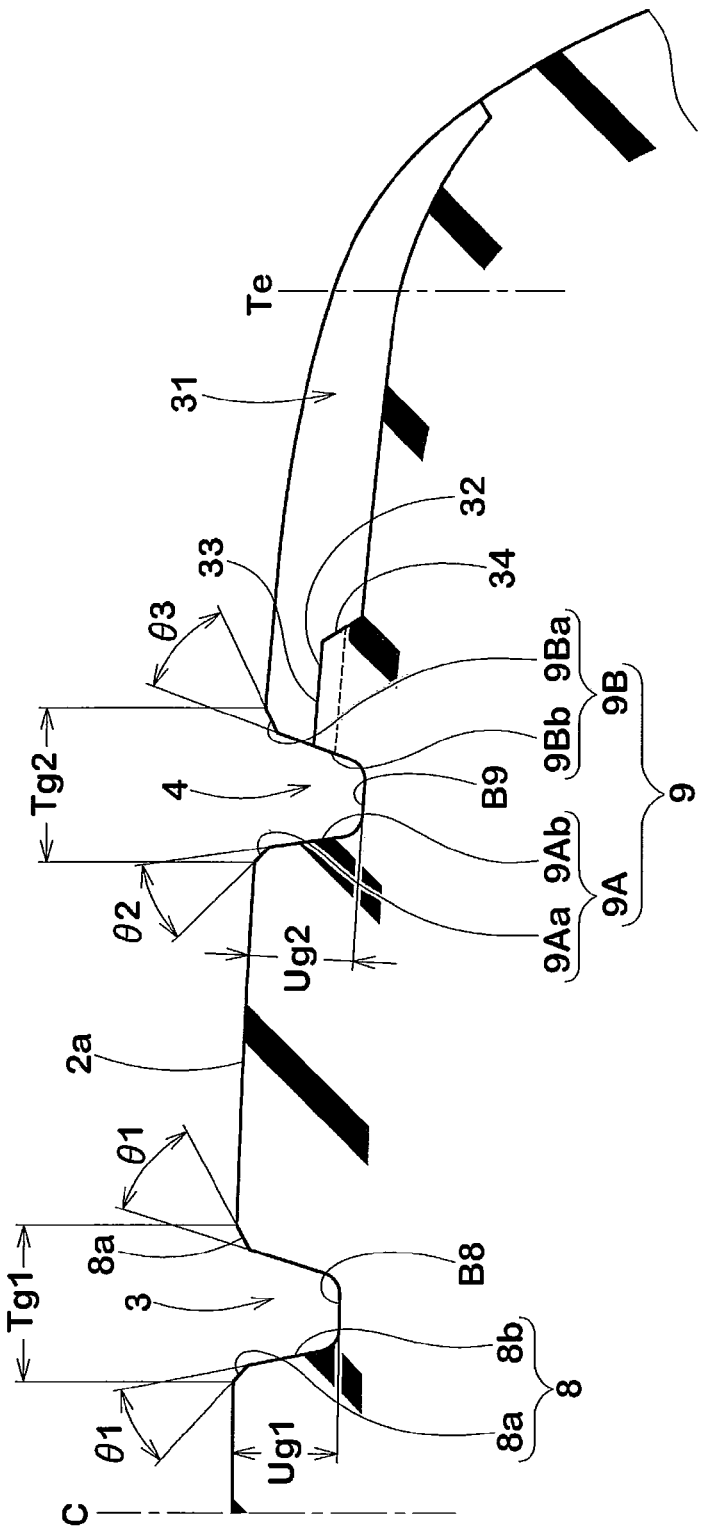
FIG. 2 is a cross sectional view of the tread portion taken along line A-A in FIG. 1.

As shown in FIG. 2, in the cross section of the tire including the tire rotational axis, the crown circumferential groove 3 has groove-sidewall surfaces 8.

The groove-sidewall surfaces 8 each comprises:
a gentle slope part 8a extending from the tread surface 2a toward the groove bottom B8 while inclining to the groove widthwise center at a smaller angle to the tread surface, and
a main part 8b extending from the radially inner end of the gentle slope part 8a toward the groove bottom B8 while inclining to the groove widthwise center at a larger angle or a right angle to the tread surface.

Further, the shoulder circumferential groove 4 has groove-sidewall surfaces 9 each comprising a gentle slope part 9a and a main part 9b similarly to the crown circumferential groove 3.

Furthermore, in the case of the groove-sidewall surfaces 9 of the shoulder circumferential groove 4 in this embodiment, the axially inner groove-sidewall surface 9A is different from the axially outer groove-sidewall surface 9B with respect to the inclination angles, and
the axially inner groove-sidewall surface 9A comprises a gentle slope part 9Aa and a main part 9Ab, and
the axially outer groove-sidewall surface 9B comprises a gentle slope part 9Ba and a main part 9Bb.

As to the groove-sidewall surfaces 8 and 9A, it is preferable that the intersecting angle $\theta 1$, $\theta 2$ of the gentle slope part 8a, 9Aa with the main part 8b, 9Ab is less than the intersecting angle $\theta 3$ of the gentle slope part 9Ba with the main part 9Bb. For example, the angle $\theta 1$ and angle $\theta 2$ are about 45 degrees, and the angle $\theta 3$ is about 60 degrees.

Thereby, deterioration of the steering stability and uneven wear occurring during high speed running can be lessened. Incidentally, the groove bottom and main part are connected through an arc (curved surface).

The above-mentioned annular portion between the crown circumferential groove 3 and shoulder circumferential groove 4 is completely crossed by middle axial grooves 21 to form the middle blocks 6 arranged in one circumferential row 6R.

In this embodiment, the axially outer edge of the crown circumferential groove 3 extends parallel with the tire circumferential direction, and as a result, each of the middle blocks 6 is provided with an axially inner edge 25 extending straight in parallel to the tire circumferential direction. Accordingly, towards the opposite direction to the intended tire rotational direction R, the width of the crown circumferential groove 3 is periodically decreased along the crown circumferential groove 3.

Therefore, the trodden snow entered into the groove 3 is packed between the groove-sidewalls of the crown circumferential groove 3 as the tire rotates in the intended tire rotational direction R, and as a result, snow grip performance, especially traction on snowy roads can be improved.

On the other hand, the axially outer edge 26 of each of the middle blocks 6 facing the shoulder circumferential groove 4 is inclined to the axially outside of the tire, toward the intended tire rotational direction R, in order to provide an axial distance W5 similar to the above-mentioned axial distance W4 and thereby to obtain the above-explained advantage effects similar to those of the axial distance W4. Thus, the width of the shoulder circumferential groove 4 is periodically decreased along the shoulder circumferential groove 4.

In the case of the axially outer edge 26, the inclination is opposite to that of the segment 13A, 13B of the side edge 13. Accordingly, in the reverse direction to the intended tire rotational direction R, the trodden snow entered into the shoulder circumferential groove 4 is packed between the groove-sidewalls of the shoulder circumferential groove 4, and as a result, snow grip performance, especially breaking force on snowy roads can be improved.

As a result, on the snowy roads, sharing force of packed snow becomes available in both of the tire rotational directions, and on-the-snow performance can be effectively improved.

Figure 5:
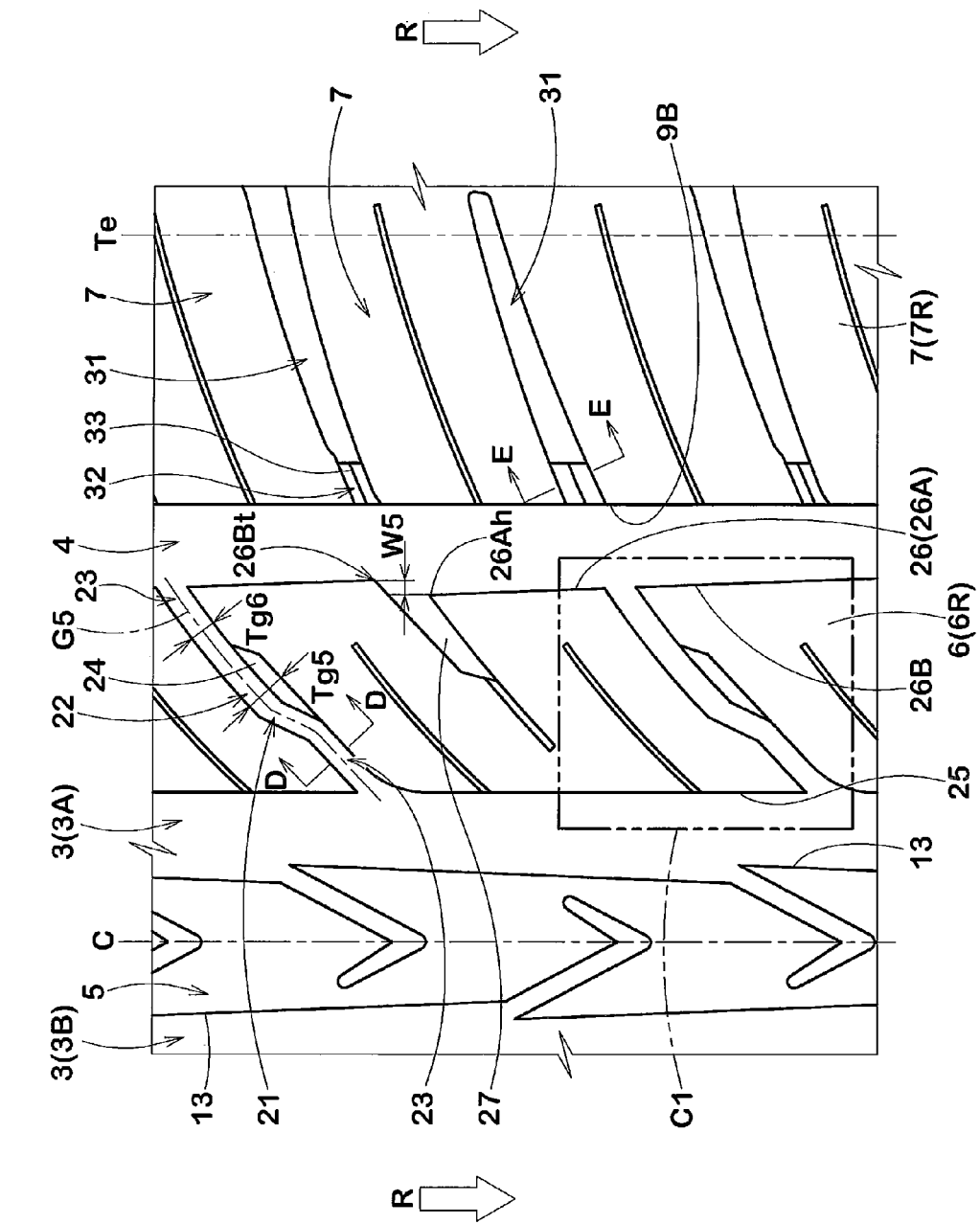
FIG. 5 is an enlarged view showing the middle block and shoulder rib.

In this embodiment, as shown in FIG. 5, the axially outer edge 26 of each middle block 6 is made up of two inclined straight segments 26A and 26B, and the above-mentioned axial distance W5 is provided in the middle of the axially outer edge 26 between the segments 26A and 26B.

The segment 26A of each block 6 and the segment 26B of the adjacent block 6 are disposed in line through the middle axial groove 21.

Each of the blocks 6 is provided between the segments 26A and 26B with a middle blind groove 27 open to the shoulder circumferential groove 4, therefore, on both sides of the middle blind groove 27 in the tire circumferential direction, the heel-side end 26Ah of the segment 26A and the toe-side end 26Bt of the segment 26B are staggered in the tire axial direction.

In order to improve on-the-snow performance, the axial distance W5 between the heel-side end 26Ah and toe-side end 26Bt is preferably set in a range of not less than 1.0 mm, more preferably not less than 2.0 mm, but not more than 4.0 mm, more preferably not more than 3.0 mm.

The middle axial grooves 21 are each inclined to the tire equator C toward the intended tire rotational direction R. The middle axial groove 21 comprises a pair of lateral parts 23 having a smaller groove width, and a central part 22 therebetween having a larger groove width than the lateral parts 23.

If the middle axial groove 21 is formed with a larger groove width along the entire length thereof, then the snow shearing force may be increased. But, there is a tendency that the rigidity of the middle block row 6R becomes insufficient, and further, the pattern noise is increased.

In contrast, in this embodiment, both of the rigidity and improvement of on-the-snow performance can be achieved since the middle axial groove 21 is narrow in the lateral parts of the middle block 6 in the tire axial direction where the rigidity is relatively low, and wide in the central part the middle block 6 where the rigidity is relatively high.

The groove width Tg5 of the wide central part 22 is preferably not less than 1.0%, more preferably not less than 1.5%, but not more than 5.0%, more preferably not more than 4.5% of the tread width TW.

The groove width Tg6 of the narrow lateral parts 23 is preferably not less than 0.5%, more preferably not less than 1.0%, but not more than 3.5%, more preferably not more than 3.0% of the tread width TW.

Further, the ratio Tg5/Tg6 of the groove width Tg5 of the wide central part 22 to the groove width Tg6 of the narrow lateral parts 23 is preferably set in a range of from 1.5 to 2.0.

Figure 6:
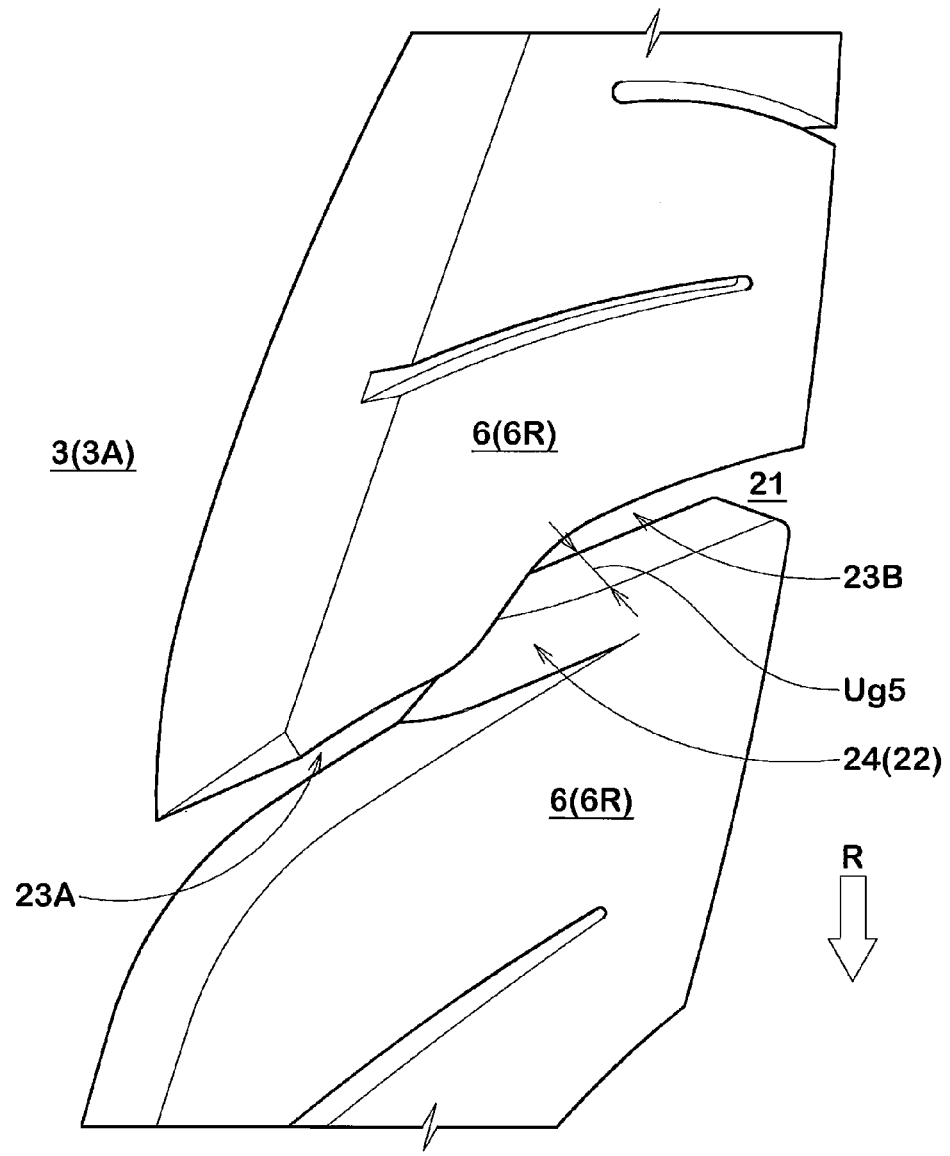
FIG. 6 is a perspective view showing the middle axial groove.

FIG. 6 is a perspective view of a part framed by a rectangle C1 in FIG. 5, showing the middle axial groove 21.

As shown in FIG. 5 and FIG. 6, in the wide part 22, a shallow part 24 is provided on one side in the tire circumferential direction by locally raising the groove bottom.

By the shallow part 24, the rigidity of the middle block 6 in the initial stage of the tire wear life can be increased, and uneven wear can be effectively controlled.

In the shallow part 24, the amount Ug5 of the raising from the groove bottom is gradually increased from the axially inner lateral part 23A towards the axially outer lateral part 23B. As a result, the shallow part 24 is formed as a slope as shown in FIG. 6. Thereby, the ground contacting area of the tread portion 2 gradually increases as the tread wear progresses. Thus, abrupt changes in tire characteristics can be avoided, and the initial drainage performance, snow self-ejecting performance and the like can be maintained for a long time.

Figure 7:
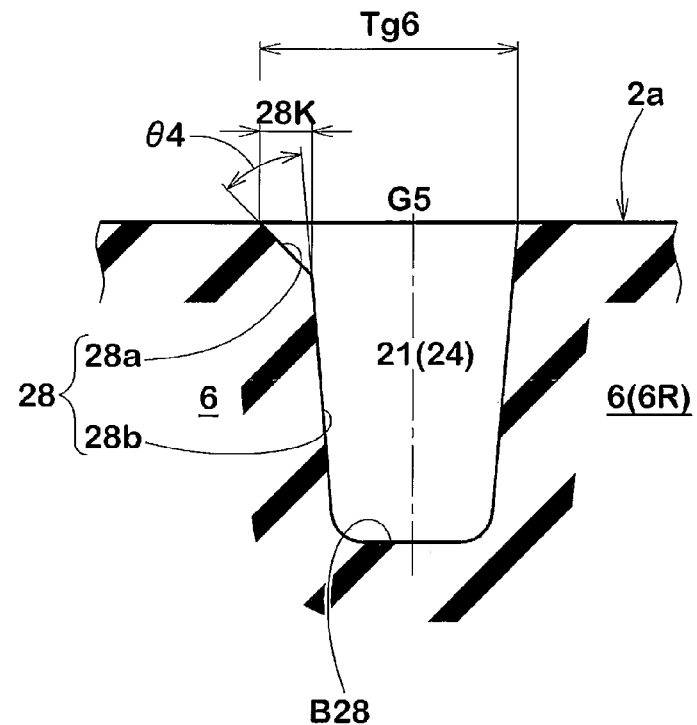
FIG. 7 is a cross sectional view of the middle axial groove taken along line B-B in FIG. 5.

FIG. 7 shows a cross section of the middle axial groove 21 taken along line D-D in FIG. 5.

The groove-sidewall surface 28 of the middle axial groove 21 comprises:

a gentle slope part 28a extending from the tread surface 2a towards the groove bottom B28 while inclining to the groove widthwise center at a smaller angle to the tread surface, and a main part 28b extending from the radially inner end of the gentle slope part 28a towards the groove bottom B28, while inclining to the groove widthwise center at a larger angle or a right angle to the tread surface 2a.

In the groove-sidewall surface 28, if the intersecting angle θ4 of the gentle slope part 28a with the main part 28b is too small, and the width 28k of the gentle slope part 28a in the perpendicular direction to the groove widthwise center line is too small, then it becomes difficult to sufficiently increase the rigidity of the middle block row 6R.

If the intersecting angle θ4 and the width 28k are too large, then the ground contacting area is decreased and there is a possibility that the grip performance deteriorates.

From this standpoint, it is preferable that the angle θ4 is 30 to 45 degrees, and the width 28k is 0.5 to 1.0 mm.

In this embodiment, only one of the groove-sidewall surfaces 28 on the toe-side in the intended tire rotational direction R is provided with the gentle slope part 28a and the main part 28b. And the groove-sidewall surfaces 28 on the heel-side is made up of the main part 28b only.

The above-mentioned annular portion between the shoulder circumferential groove 4 and the tread edge Te is completely crossed by shoulder axial grooves 31 to form shoulder blocks 7 arranged in one circumferential row 7R.

As shown in FIG. 5, each of the shoulder axial grooves 31 is provided with a tie bar 32 rising from the groove bottom so that the opposite groove sidewalls are substantially connected or supported with each other therethrough.

In this embodiment, the tie bar 32 extends from the shoulder circumferential groove 4 towards the tread edge Te by a relatively short distance.

As shown in FIG. 2, the surface 34 of the axially inner end of the tie bar 32 is an inclined surface which is substantially parallel with (in this embodiment flush with) the above-mentioned main part 9Bb of the axially outer groove-sidewall surface 9B. Also, the surface 34 of the axially outer end of the tie bar 32 is inclined to the axially outside toward the bottom of the shoulder axial groove 31.

Figure 8:
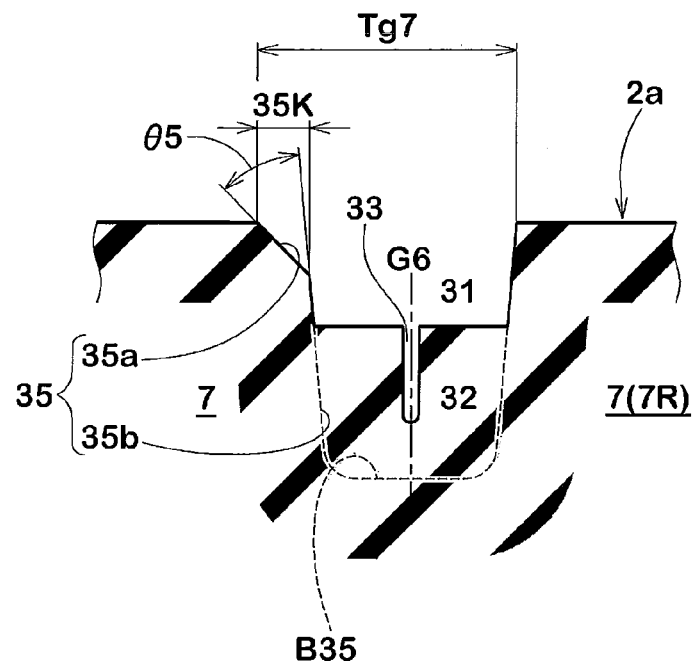
FIG. 8 is a cross sectional view of the shoulder axial groove taken along line C-C in FIG. 5.

FIG. 8 shows a cross sectional view of the tie bar 32 taken along line E-E in FIG. 5.

The height of the tie bar 32 from the groove bottom B35 is about one half of the groove depth, therefore, when the tread wear reaches to about one half of the groove depth, the tie bar 32 appears in the ground contacting surface.

In this example, in order to improve wet performance when the tie bar 32 appears in the ground contacting surface, the tie bar 32 is provided with a sipe 33 extending along the widthwise center line of the shoulder axial groove 31.

The axial width Tg7 of the shoulder axial groove 31 is preferably set in a range of from 1.0 to 4.0% of the tread width TW. If the width Tg7 is too large, the rigidity of the shoulder block row 7R becomes insufficient. If too small, on-the-snow performance tends to deteriorate.

The shoulder axial groove 31 has a groove-sidewall surface 35 comprising: a gentle slope part 35a extending from the tread surface 2a towards the groove bottom B35 while inclining to the widthwise center of the groove at a smaller angle to the tread surface; and a main part 35b extending from the radially inner end of the gentle slope part 35a towards the groove bottom B35 while inclining to the widthwise center of the groove at a larger angle or a right angle to the tread surface 2a.

If the intersecting angle θ5 of the gentle slope part 35a with the main part 35b and the width 35k of the gentle slope 35a are too small, then it becomes difficult to increase the rigidity of the shoulder block 7. If too large, on the other hand, then the ground contacting area is decreased and the grip performance tends to deteriorate.

From this standpoint, the angle θ5 is preferably set in a range of from 30 to 45 degrees, and the width 35k is preferably set in a range of from 0.5 to 1.0 mm.

In this embodiment, one of the groove-sidewall surfaces 35, which is positioned on the heel-side in the intended tire rotational direction R, is provided with only the main part 35b. But, the other groove-sidewall surface 35 on the toe-side which is subjected to a large shearing force when generating a large traction force, is provided with the gentle slope part 35a and main part 35b as explained above.

If the land ratio of the tread portion 2 is too small, the steering stability tends to deteriorate. If too large, on the other hand, on-the-snow performance and ride comfort tend to deteriorate. Therefore, the land ratio is preferably set in a range of from 68 to 72%.

Incidentally, the land ratio is the ratio of the ground contacting area to the overall area of the tread portion 2.

Comparison Tests

Radial tires of size 225/45R17 for passenger car having the tread pattern shown in FIG. 1 and specifications shown in Table 1 were prepared and tested for steering stability, on-the-ice braking performance, on-the-snow running performance and uneven wear resistance.

All of the test tires were identical except for the specifications shown in Table 1, and common specifications to all the tires are as follow.

| | |
|---|---|
| gentle slope part of middle axial groove | provided |
| gentle slope part, tie bar and sipe in shoulder axial groove | provided |
| axially outer edge of crown circumferential groove | parallel to tire equator |

-continued

| | |
|---|---|
| tread width TW | 201 mm |
| axial width Tg1 of crown circumferential groove | 5% of TW |
| axial width Tg2 of shoulder circumferential groove | 4% of TW |
| axial width Tg3 of primary part of V-shaped groove | 1.5% of TW |
| axial width Tg4 of secondary part of V-shaped groove | 1.0% of TW |
| axial width Tg7 of shoulder axial groove | 2% of TW |
| depth Ug1 of crown circumferential groove | 8.2 mm |
| depth Ug2 of shoulder circumferential groove | 8.2 mm |
| depth Ug3 from the open end to the tire equator | 60% of Ug1 |
| distance W1 of crown circumferential groove | 43% of TW |
| distance W2 of shoulder circumferential groove | 23% of TW |
| angle θ1 | 45 degrees |
| angle θ2 | 45 degrees |
| angle θ3 | 60 degrees |
| angle θ4 | 45 degrees |
| angle θ5 | 45 degrees |
| total number P | 33 |
| width 28K of gentle slope | 0.6 mm |
| width 35K of gentle slope | 0.6 mm |

Steering Stability Test:

A test car (Japanese 2000 cc front-engine front-drive passenger car) provided on all the four wheels with same test tires (tire pressure 200 kPa) was run on a dry asphalt road surface of a tire test course, and the test driver evaluated the steering response, rigid feel and road grip comprehensively based on Ref.1 tire being 100. The larger the value, the better the steering stability.

After running for 100 km on the dry asphalt road surface, the following tests were carried out.

On-the-Ice Braking Performance Test and On-the-Snow Running Performance Test:

The test car (tire pressure 220 kPa) was run on an icy road surface of the tire test course at a speed of 30 km/h and braked suddenly to lock all the wheels, and the braking distance therefrom to a stop was measured.

In Table 1, the reciprocal numbers of the braking distances measured are indicated by an index based on Ref.1 tire being 100, wherein the larger the value, the better the on-the-ice braking performance.

Further, the test car was run on a snowy road surface of the tire test course, and the test driver evaluated the steering response, rigid feel and road grip comprehensively based on Ref.1 tire being 100. The larger the value, the better the on-the-snow running performance.

Uneven Wear Resistance Test:

After running for 3000 km on the dry asphalt road surface, with respect to each of the four test tires, at each of four circumferentially different measuring positions around the tire, the difference in wear between the axial edges of the crown rib was measured, and the mean value of the 16 (4×4×1) measured values was computed.

Further, the difference in wear between the axially inner and outer edges of the middle block on each side of the tire equator were measured, and the mean value of the 32 (4×4×2) measured values was computed.

In Table 1, the reciprocal numbers of the mean values are indicated by an index based on Ref.1 tire being 100. The larger the value, the better the uneven wear resistance.

TABLE 1

Figure 9A:
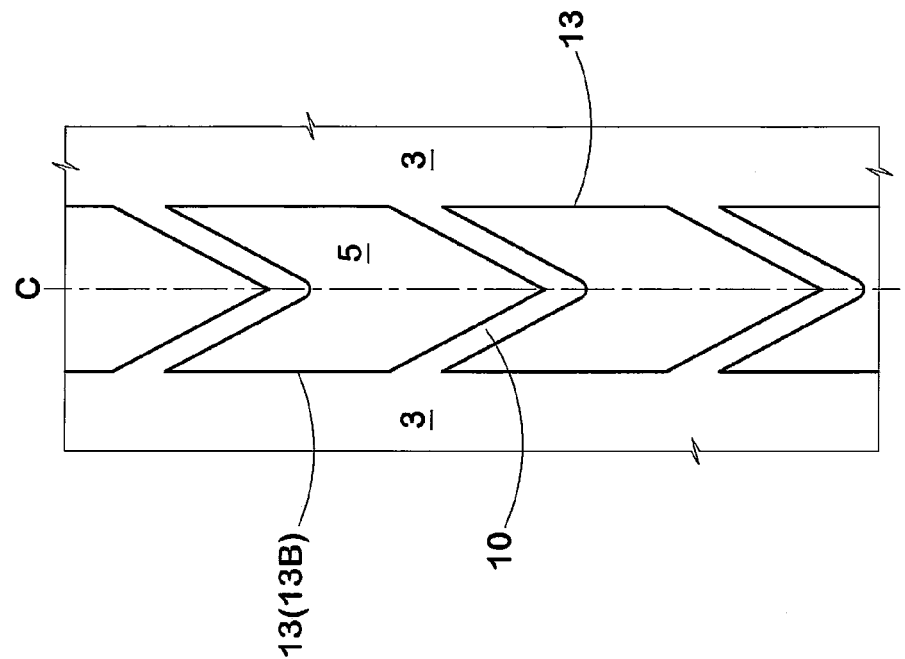
FIG. 9(A) and FIG. 9(B) show V-shaped grooves used in the undermentioned comparison tests.
Figure 9B:
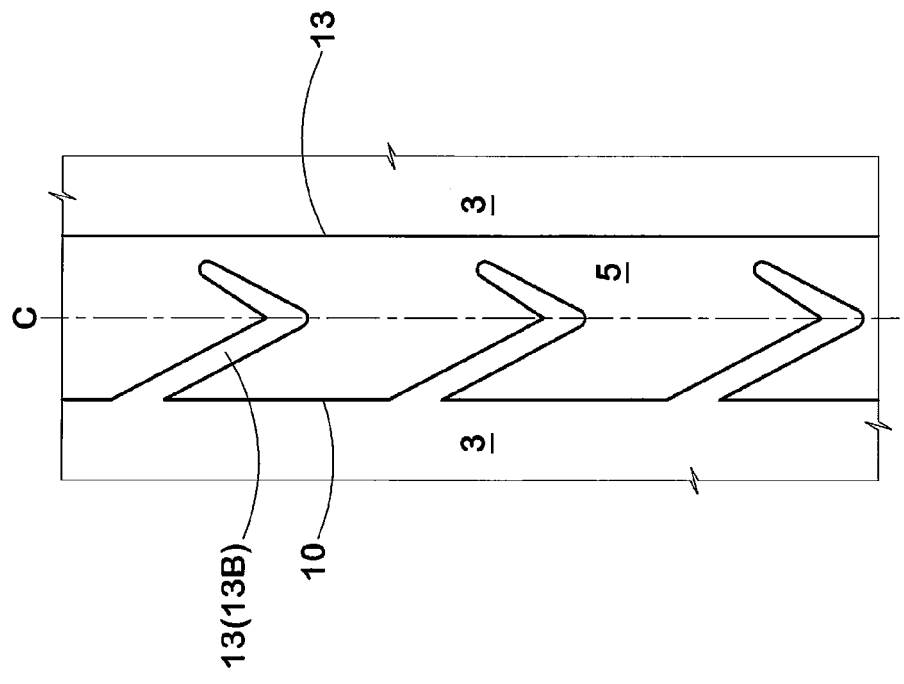

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| V-shaped groove | | | | | | | | | | | |
| Configuration | FIG. 9 (A) | FIG. 9 (B) | FIG. 3 | FIG. 3 | FIG. 3 | FIG. 3 | FIG. 3 | FIG. 3 | FIG. 3 | FIG. 3 | FIG. 3 |
| angle α1 (deg.) | 30 | 30 | 30 | 15 | 20 | 40 | 45 | 30 | 30 | 30 | 30 |
| angle α2 (deg.) | 60 | 60 | 60 | 30 | 40 | 80 | 90 | 60 | 60 | 60 | 60 |
| W3/TW (%) | 1.0 | 0 | 1.0 | 1.0 | 1.0 | 1.0 | 1.0 | 2.0 | 3.0 | 4.5 | 3.0 |
| W4 (mm) | 0 | 0 | 0 | 0 | 0 | 0 | 0 | 0 | 0 | 0 | 1.0 |
| Middle axial groove | | | | | | | | | | | |
| Tg5/TW (%) | 2.0 | 2.0 | 2.0 | 2.0 | 2.0 | 2.0 | 2.0 | 2.0 | 2.0 | 2.0 | 2.0 |
| Tg6/TW (%) | 2.0 | 2.0 | 2.0 | 2.0 | 2.0 | 2.0 | 2.0 | 2.0 | 2.0 | 2.0 | 2.0 |
| Shallow part | | | | | | | | | | | |
| Configuration | — | — | — | — | — | — | — | — | — | — | — |
| Shoulder circumferential groove W5 (mm) | 0 | 0 | 0 | 0 | 0 | 0 | 0 | 0 | 0 | 0 | 0 |
| Test results | | | | | | | | | | | |
| Steering stability | 100 | 97 | 104 | 103 | 104 | 104 | 103 | 105 | 106 | 107 | 105 |
| On-the-ice braking performance | 100 | 102 | 102 | 102 | 102 | 102 | 102 | 102 | 102 | 102 | 102 |
| On-the-snow running performance | 100 | 104 | 104 | 101 | 102 | 102 | 101 | 103 | 103 | 102 | 105 |
| Uneven wear resistance | | | | | | | | | | | |
| Crown rib | 100 | 101 | 103 | 102 | 103 | 103 | 102 | 105 | 105 | 104 | 105 |
| Middle block | 100 | 100 | 100 | 100 | 100 | 100 | 100 | 100 | 100 | 100 | 100 |

Figure 10:
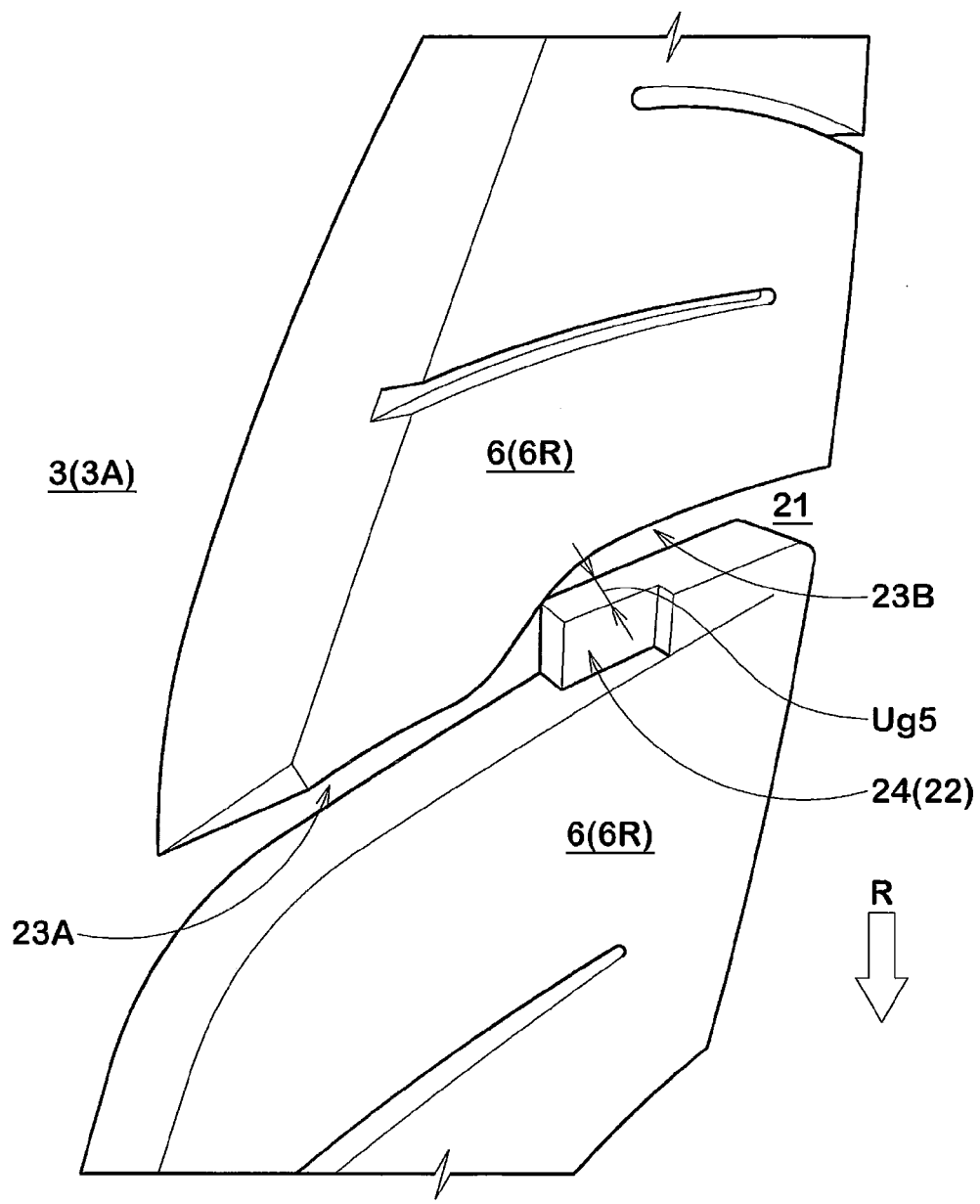
FIG. 10 is a perspective view showing another example of the middle axial groove used in the undermentioned comparison tests.

| Tire | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| V-shaped groove | | | | | | | | | | |
| Configuration | FIG. 3 | FIG. 3 | FIG. 3 | FIG. 3 | FIG. 3 | FIG. 3 | FIG. 3 | FIG. 3 | FIG. 3 | FIG. 3 |
| angle α1 (deg.) | 30 | 30 | 30 | 30 | 30 | 30 | 30 | 30 | 30 | 30 |
| angle α2 (deg.) | 60 | 60 | 60 | 60 | 60 | 60 | 60 | 60 | 60 | 60 |
| W3/TW (%) | 3.0 | 3.0 | 3.0 | 3.0 | 3.0 | 3.0 | 3.0 | 3.0 | 3.0 | 3.0 |
| W4 (mm) | 2.0 | 2.5 | 4.0 | 2.5 | 2.5 | 2.5 | 2.5 | 2.5 | 2.5 | 2.5 |
| Middle axial groove | | | | | | | | | | |
| Tg5/TW (%) | 3.0 | 3.0 | 3.0 | 3.0 | 3.0 | 4.5 | 3.0 | 3.0 | 3.0 | 3.0 |
| Tg6/TW (%) | 2.0 | 2.0 | 2.0 | 2.0 | 2.0 | 2.0 | 2.0 | 2.0 | 2.0 | 2.0 |
| Shallow part | | | | | | | | | | |
| Configuration | — | — | — | FIG. 10 | FIG. 6 | FIG. 6 | FIG. 6 | FIG. 6 | FIG. 6 | FIG. 6 |
| Shoulder circumferential groove W5 (mm) | 0 | 0 | 0 | 0 | 0 | 0 | 1.0 | 2.0 | 2.5 | 4.0 |
| Test results | | | | | | | | | | |
| Steering stability | 105 | 105 | 102 | 105 | 105 | 103 | 105 | 104 | 104 | 102 |
| On-the-ice braking performance | 102 | 102 | 102 | 102 | 102 | 102 | 102 | 102 | 102 | 102 |
| On-the-snow running performance | 107 | 107 | 109 | 105 | 106 | 108 | 109 | 110 | 111 | 112 |
| Uneven wear resistance | | | | | | | | | | |
| Crown rib | 105 | 105 | 105 | 105 | 105 | 105 | 105 | 105 | 105 | 105 |
| Middle block | 100 | 100 | 100 | 102 | 104 | 103 | 104 | 104 | 104 | 104 |

The invention claimed is:

1. A pneumatic tire comprising
a tread portion provided with a unidirectional tread pattern having an intended rotational direction and including a pair of right-hand and left-hand crown circumferential grooves which are disposed one on each side of the tire equator and extend continuously in the tire circumferential direction so as to form a circumferentially continuously extending crown rib therebetween,
a shoulder circumferential groove extending continuously in the tire circumferential direction and disposed on the axially outside of each of the crown circumferential grooves, and middle axial grooves extending from said shoulder circumferential groove to the crown circumferential groove, while inclining to the rotational direction, so that a row of circumferentially arranged middle blocks is formed,
the crown rib being provided with first V-shaped grooves and second V-shaped grooves arranged alternately in the tire circumferential direction, wherein each of the axial edges of the crown rib is made up of straight segments defined between the circumferentially adjacent open ends of the V-shaped grooves, and wherein the straight segments are inclined to the tire equator toward the rotational direction so that one circumferential end of each of the straight segments is axially shifted from the circumferentially adjacent other circumferential end of one of the circumferentially adjacent straight segments,
each of the first V-shaped grooves extending from its open end at the left-hand crown circumferential groove to its closed end positioned between the right-hand crown circumferential groove and the tire equator, and each of the second V-shaped grooves extending from its open end at the right-hand crown circumferential groove to its closed end positioned between the left-hand crown circumferential groove and the tire equator,
wherein each of the first and second V-shaped grooves is made up of a primary part extending from the open end thereof towards the tire equator while inclining to one circumferential direction corresponding to the rotational direction, and a secondary part extending from the primary part to the closed end while inclining to the other circumferential direction opposite to the rotational direction, wherein a bending point between the primary part and secondary part is substantially positioned at the tire equator, wherein each of the crown circumferential grooves has an axially outer edge extending straight in parallel with the tire circumferential direction, and the axially outer edges of the middle blocks are inclined to the axially outside toward the rotational direction so that, toward the rotational direction, the width of each of the shoulder circumferential grooves is periodically decreased along the shoulder circumferential groove, whereas the width of each of the crown circumferential grooves is periodically increased along the crown circumferential groove.

2. The pneumatic tire according to claim 1, wherein the inclination angle of the primary part is in a range of from 20 to 40 degrees with respect to the circumferential direction, and the angle between the primary part and the secondary part is in a range of from 40 to 80 degrees.

3. The pneumatic tire according to claim 1, wherein the axial shift between said one circumferential end and the other circumferential end is in a range of from 1.0 to 4.0 mm.

4. The pneumatic tire according to claim 1, wherein each of the middle axial grooves comprises a wide central part having a larger groove width and a pair of lateral parts disposed one on each side of the wide central part and having a narrower groove width than the wide central parts.

5. The pneumatic tire according to claim 4, wherein said wide central part is provided with a shallow part shifted to one of the sidewalls of the middle axial groove, and a deep part shifted to the other sidewall.

6. The pneumatic tire according to claim 5, wherein in the shallow part, the groove depth is gradually increased from one of the lateral parts to the other lateral part.

* * * * *